Aug. 19, 1969         P. E. THOMA         3,461,723
SYNTHETIC HUMIDITY SENSING ELEMENT AND METHOD
OF PREPARING THE SAME
Filed July 10, 1967

Inventor
Paul E. Thoma
By Andrus & Starke
Attorneys

United States Patent Office 3,461,723
Patented Aug. 19, 1969

3,461,723
SYNTHETIC HUMIDITY SENSING ELEMENT AND METHOD OF PREPARING THE SAME
Paul E. Thoma, Milwaukee, Wis., assignor to Johnson Service Company, Milwaukee, Wis., a corporation of Wisconsin
Filed July 10, 1967, Ser. No. 652,287
Int. Cl. G01n 25/56
U.S. Cl. 73—335
17 Claims

ABSTRACT OF THE DISCLOSURE

This invention relates to a varying dimension humidity sensing element having improved chemical resistance and creep resistance. The element includes a strip of a relatively hard, flexible, moisture resistant material, and a layer of moisture sensitive material is bonded to one surface of the strip. The moisture sensitive layer is an organic crosslinked material produced by the reaction of a substance containing glucoside chains with a stabilizing monomer capable of reacting with the hydroxyl groups of the glucoside.

---

Humidity sensing devices are generally classified as a mechanical type or an electrical type. The mechanical type of humidity sensing device utilizes the dimensional change which occurs in the humidity sensing material when there is a change in relative humidity to either indicate the relative humidity or to actuate a humidity control system, while the electrical type utilizes a change in the electrical resistance or capacitance of the humidity sensing element due to a change in relative humidity.

In the past, human hair, wood, goldbeater skin and animal horn have been used as the element in the mechanical type of humidity sensing device. The humidity sensing element is connected to an operating mechanism and changes in dimension of the element resulting from humidity changes produce a signal which can be used to indicate through a dial the calibrated degree of moisture content in the atmosphere, or alternately, to actuate a humidity control device.

The common forms of varying-dimension, humidity sensing elements have certain inherent disadvantages. The elements are extremely fragile and are frequently damaged in shipment. More important, however, the elements are difficult to produce and this is particularly true of the horn element, for it requires a very precise operation to cut the horn material into thin layers of uniform thickness. Since most of the conventional elements are naturally occurring, it is difficult to obtain uniform performance from element-to-element, and uniformity is only obtainable through very careful calibration. Moreover, the elements generally do not retain their original calibration after long term exposures to extremes of humidity and in many cases require frequent re-calibration.

Another disadvantage of the conventional varying-dimension, humidity sensing element is that the element is difficult to clean, for it cannot satisfactorily be washed with solvents or detergent solutions without adversely affecting the performance of the element. In view of this, the elements must be replaced after a period of use as they cannot successfully be cleaned.

The present invention is directed to a synthetic, varying-dimension humidity sensing element which has improved chemical resistance and creep resistance and overcomes the inherent disadvantages of the natural-occurring elements.

More specifically, the humidity sensing element of the invention includes a hard, yet flexible, moisture insensitive base or core, and an outer moisture sensive layer is bonded to one surface of the core and is generally coextensive in dimension with the core. The moisture sensitive layer is a crosslinked material formed by the reaction of a substance containing glucoside chains and a monomer which is capable of reacting with the hydroxyl groups of the glucoside. The crosslinked moisture sensitive layer has improved resistance to plastic deformation or creep and thereby maintains the sensitivity and calibration of the element. Moreover, the element has improved chemical resistance due to the crosslinking and thereby the moisture sensitive layer can be washed with commercial solvents or detergent solutions without danger of destroying the performance of the element.

The humidity sensing element of the invention has a rapid response to humidity conditions and is not affected by extremes of humidity or temperature. The element has very little hysteresis and is substantially more stable than natural-occurring humidity sensing elements used in the past.

As the element is a synthetic product, it can be fabricated under controlled conditions and therefore requires less calibration from element-to-element.

Other objects and advantages will appear in the course of the following description.

The drawings illustrate the best mode presently contemplated of carrying out the invention.

Figure 1:
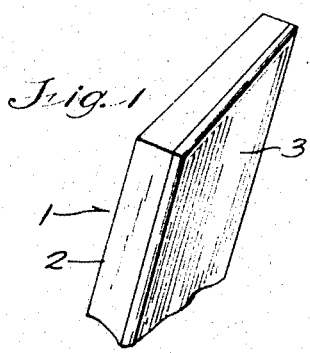
FIG. 1 is a perspective view of the humidity sensing element of the invention.

FIG. 1 illustrates a humidity sensing element 1 comprising a core 2 and an outer layer 3 which is integrally bonded to one surface of the core. The core 2 is formed of a relatively hard, flexible material having a modulus of elasticity greater than $0.1 \times 10^6$ p.s.i., less than $60 \times 10^6$ p.s.i. and preferably from $10 \times 10^6$ to $30 \times 10^6$ p.s.i. The material from which the core 2 is formed is relatively insensitive to moisture and capable of withstanding the mechanical load with insignificant creep. The core need not be completely insensitive to moisture but should have a dimensional increase of less than 1%, and preferably less than ½%, with a change from 0% to 100% relative humidity.

The core 2 can be formed of a metal or alloy such as steel, aluminum, copper, aluminum bronze, stainless steel, or the like, or can be formed of an organic material such as a polyacetal film sold under the trade name Delrin (E. I. du Pont de Nemours & Co.), oriented polyester films such as Mylar (E. I. du Pont de Nemours & Co.), oriented polyolefin films such as polyethylene or polypropylene, and the like.

The layer 3 is a crosslinked reaction product formed by the reaction of a compound containing glucoside chains, such as a cellulosic material, and a stabilizing monomer capable of reacting with the hydroxyl groups of the glucosides. For example, the reactant can be cellulose or a cellulose ester in which the esterifying acids contain up to 20 carbon atoms and preferably up to 6 carbon atoms. Specific examples are cellulose nitrate, cellulose triacetate, cellulose butyrate, cellulose propionate, cellulose succinate, cellulose phthalate or the like. Mixed cellulose esters such as cellulose acetate-butyrate, cellulose acetate-propionate, cellulose ethers in which the etherifying alcohol contains up to 8 carbon atoms, such as ethyl cellulose, methyl cellulose, hydroxypropylmethylcellulose, and hydroxybutylmethylcellulose can also be employed.

The cellulosic material is extremely sensitive to moisture conditions in the atmosphere and will change in dimension in accordance with changes in relative humidity.

The stabilizing reactant which is crosslinked with the moisture sensitive material can take the form of monomers or partial polymers of urea-formaldehyde, phenol-formaldehyde, melamine-formaldehyde, triazine-formaldehyde, hexamethoxy-methylmelamine, glyoxal, glutaraldehyde, 2-hydroxyadipaldehyde and the like.

The amount of the stabilizing monomer to be used in conjunction with the glucoside derivative can vary depending on the nature of the monomer. In the case of a resin which will crosslink with itself such as urea-formaldehyde, the monomer or partial polymer can vary within wide limits, as for example, 1 to 99% by weight of the glucoside derivative. Any excess of the monomer, over and above that which will react and crosslink with the glucoside will crosslink with itself, and while a moisture sensitive layer having a high proportion of the stabilizing monomer may be less sensitive than one which contains a smaller percentage, it will nevertheless be workable. The stabilizing monomer need not react with all available hydroxyl groups of the glucosides and in some formulations the monomer reaction with the hydroxyl groups may be quite low. With a stabilizing monomer or partial polymer that will not crosslink with itself, such as hexamethoxymethylmelamine, the monomer should be used in a stoichiometric amount or less with the glucoside derivative or cellulosic material, for any excess will tend to act as a plasticizer for the outer layer 3 and thereby increase the creep of the element.

To accelerate the crosslinking reaction, a catalyst is usually added to the reaction mixture. Any conventional catalyst for the particular monomers or partial polymers being employed can be used. For example, catalysts to be used with urea-formaldehyde, phenol-formaldehyde and melamineformaldehyde monomers include trifluoroacetic acid, methanesulfonic acid, monobutyl acid orthophosphate, n-butyl acid phosphate, p-toluenesulfonic acid, butyl acid maleate and the like.

In addition to the catalyst, it may also be desirable in many instances to employ a catalyst stabilizer which serves to tie up the catalyst until the crosslinking reaction is desired to occur. The catalyst stabilizers are conventional materials and include epoxide monomers and triethylamine, 2-dimethylaminoethanol, 2-diethylaminoethanol, and other volatile organic amines having boiling points below 250° C. The epoxide monomers can be used as both a catalyst stabilizer and as a reactant in the crosslinking reaction.

The resulting crosslinked outer layer 3 should have a moisture sensitivity such that the material will show a dimensional increase of at least 1%, and preferably 1½% to 7%, with a change from 0% to 100% relative humidity. These sensitivity values are based on the outer layer disassociated from the core and need be in only one direction.

The thickness of the core 2 has a definite relation to the thickness of the outer layer 3. If the core is too thick with respect to the thickness of the outer layer, the outer layer cannot provide the necessary dimensional change under changes in atmospheric moisture to deflect or bend the core. For an element having normal response, the thickness of the core will generally be in the range of about 2 to 10 mils while the thickness of the layer 3 will be less than about 3 mils and should generally be between 5% to 100% of the thickness of the core 2. However, this relationship can vary, depending on the moisture sensitivity and modulus of elasticity of the outer layer 3 and core 2 and the response desired. The optimum thickness ratio of the outer surface layer with respect to the core 2 is generally arrived at experimentally.

It is preferred that the core 2 and the outer layer 3 be coextensive in length and width. However, in some instances either the core 2 or the outer layer 3 may project beyond the other member of the element and the function of the elements will not be altered. Any mechanical clamping of the element in use should be directly linked to the core and not solely attached to the outer layer 3.

As shown in FIG. 1, the moisture sensitive layer 3 is bonded to only one surface of the core 2, and as the layer 3 changes dimension in accordance with variations in relative humidity, the core will bow or deflect. Due to the relatively high modulus of elasticity of the core 2, a substantially linear-moving element, in which the moisture sensitive material 3 is bonded to both opposite surfaces of the core 2, is not as satisfactory as the type of element shown in FIG. 1.

The core and outer layer 3 are bonded together throughout their dimensions and various methods may be employed to provide the bond between the members. For example, the outer layer 3 can be applied by coating the core 2 with a solvent solution of the reactants and subsequently evaporating the solvent. The core with the dried outer layer 3 can then be heated to a temperature sufficient to activate the crosslinking of the reactants in the outer layer. In this method the crosslinking also aids in improving the adherence between the outer layer 3 and the core 2. As an alternate method, the fully polymerized or crosslinked outer layer 3 can be bonded to the core 2 by use of auxiliary adhesives.

The preferred method of preparing the humidity sensing element is to initially dissolve the glucoside compound and the stabilizing monomer, along with the catalyst and the catalyst stabilizer, in a solvent such as acetone, ethyl acetate, ethylmethylketone, isobutyl alcohol, methylenechloride, nitroethane, cyclohexanone, ethylene dichloride, methylisobutylketone, isobutylacetate, hexane, toluene, diethyl ether, water, ethyl alcohol, xylene, isopropyl alcohol or the like. It is preferred to dissolve the materials in the solvent, or solvent mixture, in a closed container with mixing or agitation. The solution is then cast onto a glass plate and the solvent is permitted to evaporate. The resulting film is stripped from the glass and cut into strips or bands of the desired size and applied to the core with a weak solvent or an adhesive, such as an epoxide resin.

The element is then heated to an elevated temperature in the range of 200 to 400° F. and preferably 250° F. to 375° F. for a period of time sufficient to crosslink the stabilizing monomer and the hydroxyl groups of the glucoside chains. If an adhesive, such as an epoxide resin, is employed, heating at this temperature will also provide a crosslinking reaction between the epoxide resin and the other reactants to provide a strong adhesive bond between the outer layer 3 and the core 2.

In some instances it is possible to incorporate the bonding adhesive into the reaction mixture. For example, an epoxide monomer or partial polymer can be incorporated in the solvent solution with the glucoside derivative and the stabilizing monomer. In this case the surface of the core is coated with a weak solvent such as ethyl alcohol. When the dried, moisture sensitive film is applied to the surface of the core, a weak, initial bond is provided between the film or outer layer and the core. On heating, crosslinking will occur to provide the strong bond between the outer layer 3 and the core 2. The strong bond between the outer layer 3 and the core 2 may be due to the epoxide monomer, the stabilizing monomer or both in combination.

While the crosslinking reaction can be made to occur at room temperature in most formulations, better results are obtained when the reaction is carried out at an elevated temperature in the range of 275° F. to 375° F.

Specific examples of humidity sensitive layer formulations of the invention are as follows:

EXAMPLE No. 1

| | Grams |
|---|---|
| Cellulose acetate butyrate (37% combined butyryl) | 6.2 |
| Urea-formaldehyde monomer | 6.2 |
| Epoxide monomer (catalyst stabilizer) | 1.65 |
| p-Toluenesulfonic acid (catalyst) | 0.15 |
| Ethyl acetate | 5.0 |
| Isobutyl acetate | 5.0 |
| Isobutyl alcohol | 22.0 |
| 2-heptanone | 10.0 |
| Xylene | 17.0 |
| Toluene | 26.8 |

EXAMPLE No. 2

| | Grams |
|---|---|
| Cellulose acetate butyrate (26% combined butyryl) | 6.0 |
| Hexamethoxymethylmelamine (crosslinking material) | 4.0 |
| 2-dimethylaminoethanol (catalyst stabilizer) | 1.5 |
| p-Toluenesulfonic acid (catalyst) | 0.1 |
| Ethyl acetate | 88.4 |

EXAMPLE No. 3

| | Grams |
|---|---|
| Ethyl cellulose (45.5 to 46.8% ethoxyl content) | 10.0 |
| Melamine formaldehyde monomer | 3.0 |
| 2-dimethylaminoethanol (catalyst stabilizer) | 1.6 |
| p-Toluenesulfonic acid (catalyst) | 0.15 |
| n-Butyl alcohol | 1.15 |
| Xylene | 1.0 |
| Methylene chloride | 83.1 |

EXAMPLE No. 4

| | Grams |
|---|---|
| Hydroxypropylmethylcellulose | 10.0 |
| Hexamethoxymethylmelamine (crosslinking material) | 1.5 |
| p-Toluenesulfonic acid (catalyst) | 0.05 |
| n-Butyl alcohol | 0.05 |
| Ethyl alcohol | 20.0 |
| Deionized water | 68.4 |

EXAMPLE No. 5

| | Grams |
|---|---|
| Nitrocellulose (11.8 to 12.2% nitrogen) | 10.0 |
| Triazine formaldehyde monomer | 6.2 |
| n-Butyl acid phosphate (catalyst) | 0.3 |
| Methyl ethyl ketone | 40.0 |
| Ethyl acetate | 15.0 |
| Isobutyl acetate | 10.0 |
| 2-heptanone | 10.0 |
| Isopropyl alcohol | 4.3 |
| Xylene | 2.1 |
| n-Butyl alcohol | 2.1 |

EXAMPLE No. 6

| | Grams |
|---|---|
| Nitrocellulose (11.8 to 12.2% nitrogen) | 10.0 |
| Hexamethoxymethylmelamine (crosslinking material) | 1.5 |
| p-Toluenesulfonic acid (catalyst) | 0.05 |
| n-Butyl alcohol | 0.05 |
| Isopropyl alcohol | 4.3 |
| 2-heptanone | 14.0 |
| Isobutyl acetate | 14.1 |
| Ethyl acetate | 16.0 |
| Methyl ethyl ketone | 40.0 |

EXAMPLE No. 7

| | Grams |
|---|---|
| Cellulose acetate (39.4% acetyl) | 10.0 |
| Hexamethoxymethylmelamine (crosslinking material) | 1.5 |
| p-Toluenesulfonic acid (catalyst) | 0.5 |
| n-Butyl alcohol | 0.5 |
| Triethylamine (catalyst stabilizer) | 1.5 |
| Methylene chloride | 6.0 |
| Diacetone alcohol | 10.0 |
| Acetone | 70.0 |

EXAMPLE No. 8

| | Grams |
|---|---|
| Cellulose acetate propionate | 10.0 |
| Hexamethoxymethylmelamine (crosslinking material) | 1.5 |
| p-Toluenesulfonic acid (catalyst) | 0.5 |
| n-Butyl alcohol | 0.5 |
| 2-dimethylaminoethanol (catalyst tsabilizer) | 1.5 |
| Ethylene dichloride | 16.0 |
| Methyl ethyl ketone | 70.0 |

A specific example of preparing the humidity sensing element of the invention using the formulation of Example 1 is as follows:

The solution (Example No. 1 formulation) was cast on a glass plate and the solvent mixture was allowed to evaporate. After evaporation of the solvent, the film was removed from the glass plate and was cut into strips having a size of 1¼ x ⅜ inches. A surface of an aluminum core having a dimension of 1 inch x ¼ inch x 0.004 inch was coated with ethyl alcohol, and a strip of the dried film was laid on top of the alcohol coated surface of the core. When the ethyl alcohol solvent evaporated, a weak bond resulted between the film and the core. Subsequently, the coated core was placed in an oven and heated to a temperature of 350° F. for a period of 15 minutes resulting in a crosslinking between the urea-formaldehyde, epoxide monomer, and cellulose acetate butyrate and a strong bond between the core and humidity sensitive layer.

Figure 2:
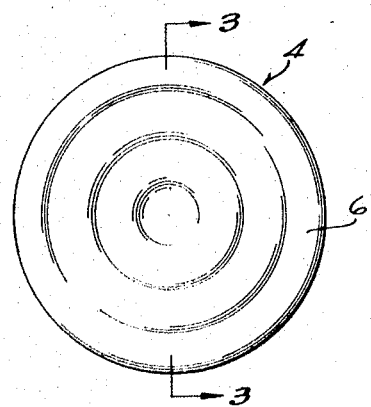
FIG. 2 is a modified form of the invention showing the humidity sensing element in the form of a corrugated diaphragm.
Figure 3:
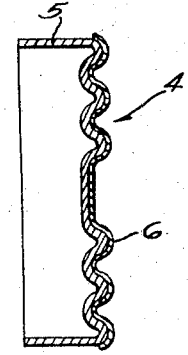
FIG. 3 is a section taken along line 3—3 of FIG. 2.

FIG. 2 shows a form of the invention in which the humidity sensing element 4 is in the shape of a diaphragm or disc. In this embodiment the element 4 is composed of a base member 5, formed of a material similar to core 2 of the first embodiment, and an outer layer 6 is bonded to the base 5. The outer layer 6 is composed of a moisture sensitive, crosslinked material similar to that of outer layer 3. In this structure a variation in relative humidity will cause the central portion of the element to flex to thereby provide a dimensional change with a change in relative humidity.

Figure 4:
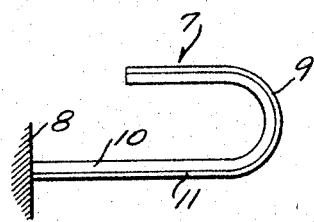
FIG. 4 is a second modified form of the invention showing the element in the form of a U-shaped cantilever.

FIG. 4 illustrates a modified form of the invention in which the element 7 has a generally U-shape. One end of the element is fixed or clamped to an outside object 8, while the opposite end is provided with a reverse bend 9. The element, as in the case of the first embodiment, is formed of a core material 10, similar to core 2, and an outer layer 11 is bonded to one surface of the core and is formed of a crosslinked material similar to outer layer 3. On an increase in relative humidity, the bent portion 9 will tend to deflect toward the body portion of the element, while on a decrease in relative humidity the bent end 9 will deflect in the opposite direction, thereby providing an indication of the moisture in the atmosphere.

Figure 5:
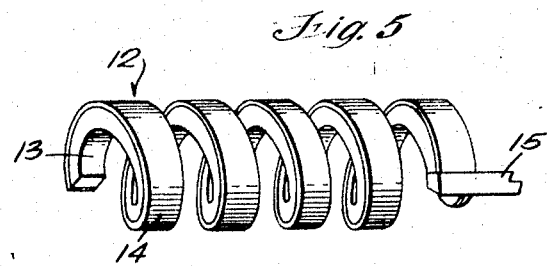
FIG. 5 is another modified form of the invention showing the element in the form of a helix coil.

The structure shown in FIG. 5 is another modified form of the invention in which the element 12 is in the form of a helix and is composed of a core 13, similar to core 2, and an outer layer 14, similar to outer layer 3, is bonded to core 13. One end of the spiral or helix element is fixed to an outside object as indicated at 15. With a variation in relative humidity, the helix will tend to rotate and by attaching the outer or free end to an operating mechanism, the rotation of the element resulting from humidity changes will produce a signal which can be used to indicate either the degree of moisture in the atmosphere or to actuate a humidity control device.

Figure 6:
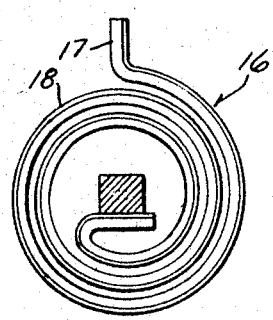
FIG. 6 is a further modified form of the invention showing the element in the form of a spiral coil.

FIG. 6 represents a further modified form of the invention in which the element 16 is in the shape of a spiral coil. As in the case of the previous embodiments the coil 16 is composed of a core 17 and an outer moisture sensitive layer 18 which is bonded to one side of the core throughout its length. The core 17 and moisture sensitive layer 18 are formed of materials similar to that described with respect to core 2 and outer layer 3.

The inner end of the coil 16 is clamped or attached to a fixed object, while the outer end of the coil is connected to an operating mechanism. On changes in relative humidity, the coil will expand or contract and this movement acts through the operating mechanism to indicate the relative humidity of the atmosphere or to actuate a humidity control device.

Figure 7:
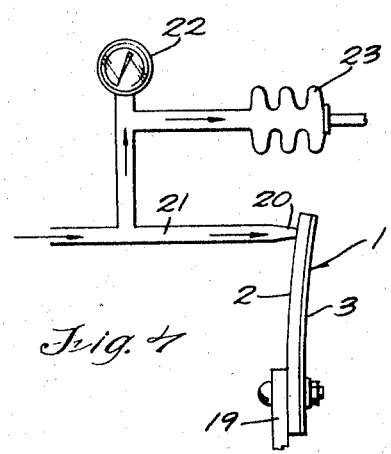
FIG. 7 is a schematic representation showing the use of the element in a pneumatic type humidity control device.

FIG. 7 shows the humidity sensing element 1 as used in a pneumatic humidity control. In this embodiment one end of the element 1 is clamped to a fixed support 19, while the opposite end of the element 1 is adapted to restrict air flow through a nozzle 20 which is connected in air line 21. As the relative humidity in the atmosphere varies, the element 1 will bow or deflect to thereby vary the position of the element 1 with respect to the nozzle 20, causing the air pressure within the line 21 to vary. The resulting pneumatic signal can be used to indicate relative humidity directly through a gauge 22 or to provide a mechanical input to humidification equipment through a pressure responsive member such as a bellows 23.

When there is substantial moisture in the atmosphere, the element 1 will be very nearly straight, having only a slight bow or curvature, and being in engagement with, or in close proximity, to the nozzle 20 to restrict the air flow through the nozzle. When the element bows, due to a decrease in moisture in the atmosphere, the element will move outwardly from the nozzle, thereby increasing the air flow through the nozzle and correspondingly varying the air flow and pressure in line 21.

Due to the crosslinked structure of the outer layer 3, the outer layer is highly resistant to solvents and detergents so that the elements can be washed or cleaned with solvents or detergent solutions without destroying the performance of the element.

The element, due to the crosslinked structure is resistant to creep or plastic deformtion and yet exhibits a rapid response to humidity conditions with minimum hysteresis.

As the element is fabricated synthetically under controlled conditions, the characteristics of the elements are more uniform and less element-to-element calibration is required.

I claim:

1. A synthetic humidity sensing element, comprising a first layer formed of a flexible strip of a relatively hard material, and a second layer extending over a substantial portion of a surface of the first layer and being sensitive to moisture conditions and capable of increasing in dimension with increases in relative humidity, said first layer being relatively insensitive to moisture and tending to resist the increase in dimension of said second layer, said second layer being composed of a substantially fully crosslinked material formed by the reaction of a compound containing glucoside chains and a stabilizing monomer or partial polymer capable of crosslinking with the hydroxyl groups of said glucoside chains.

2. The element of claim 1 in which said first layer has a dimensional increase of less than 1% with a change from 0% to 100% relative humidity and said second layer shows a dimensional increase of at least 1% with a change from 0% to 100% relative humidity.

3. The element of claim 1, in which said compound is a cellulose ester in which the esterifying acid contains up to 20 carbon atoms.

4. The element of claim 1, in which said strip is formed of a metallic material.

5. The element of claim 1, in which the second layer is substantially coextensive in dimension with the first layer.

6. The element of claim 1, wherein said first layer has a modulus of elasticity in the range of $10 \times 10^6$ p.s.i. to $30 \times 10^6$ p.s.i.

7. The element of claim 1, in which the first layer has a thickness in the range of 2 to 10 mils and the second layer has a thickness of 5% to 100% of the first layer.

8. The element of claim 1, in which the stabilizing monomer, or partial polymer is a type capable of reacting with said hydroxyl groups and crosslinking with itself.

9. The element of claim 8, in which the monomer or partial polymer is selected from the group consisting of urea-formaldehyde, phenol-formaldehyde, melamine-formaldehyde and triazine-formaldehyde.

10. The element of claim 8, in which the stabilizing monomer is hexamethoxymethylmelamine.

11. A humidity sensing element, comprising a thin flexible strip of a relatively hard material relatively insensitive to moisture whereby said material shows a dimensional increase of less than 1% with a change in relative humidity from 0% to 100%, and a moisture sensitive layer bonded to a surface of said strip and being sensitive to moisture whereby said layer shows a dimensional increase greater than 1% with a change in relative humidity from 0% to 100%, said layer being composed of a substantially fully crosslinked material formed by the reaction of a cellulosic material having free hydroxyl groups and a stabilizing monomer or partial polymer capable of crosslinking with the hydroxyl groups of said cellulosic material.

12. A method of preparing a synthetic humidity sensing element, comprising the steps of dissolving a compound containing glucoside chains and a stabilizing monomer or partial polymer capable of reacting with the hydroxyl groups of the glucoside chains in a solvent to provide a solvent solution, casting the solution in the form of a film, evaporating the solvent to provide a dried film, applying the dried film to a surface of a flexible hard core, and heating the core to a temperature sufficient to react said monomer or partial polymer with said hydroxyl groups to provide a chemical resistant, moisture sensitive crosslinked outer layer firmly bonded to said core.

13. The method of claim 12, and including the step of dissolving in said solvent, along with said compound and said monomer or partial polymer, a catalyst for said monomer or partial polymer and a catalyst stabilizer.

14. The method of claim 12, in which the compound is a cellulose ester with the esterifying acid containing up to 20 carbon atoms.

15. The method of claim 12, in which the core is a metal strip having a thickness in the range of 2 to 10 mils.

16. The method of claim 12, in which the core and the outer layer are heated to a temperature in the range of 200 to 400° F.

17. The method of claim 12, wherein the solvent is water and the stabilizing monomer or partial polymer is water soluble.

References Cited

UNITED STATES PATENTS

| | | | |
|---|---|---|---|
| 2,604,423 | 7/1952 | Slotterbeck et al. | 73—337 X |
| 3,295,088 | 12/1966 | Smith | 73—335 X |
| 3,301,057 | 1/1967 | Smith et al. | 73—337 |

LOUIS R. PRINCE, Primary Examiner

J. W. ROSKOS, Assistant Examiner

U.S. Cl. X.R.

73—337